United States Patent
Leslie

(10) Patent No.: US 9,701,478 B1
(45) Date of Patent: Jul. 11, 2017

(54) FLUSH ENDS CONTAINER GRIPPER

(71) Applicant: John M. Leslie, Blountville, TN (US)

(72) Inventor: John M. Leslie, Blountville, TN (US)

( * ) Notice: Subject to any disclaimer, the term of this patent is extended or adjusted under 35 U.S.C. 154(b) by 0 days.

(21) Appl. No.: 14/998,465

(22) Filed: Jan. 7, 2016

(51) Int. Cl.
*B65G 17/32* (2006.01)
*B65G 17/44* (2006.01)

(52) U.S. Cl.
CPC ........... *B65G 17/323* (2013.01); *B65G 17/44* (2013.01)

(58) Field of Classification Search
CPC .... B65G 17/323; B65G 17/065; B65G 17/12; B65G 17/32; B65G 17/42; B65G 17/44
USPC ............................................ 198/690.2, 626.6
See application file for complete search history.

(56) References Cited

U.S. PATENT DOCUMENTS

| | | | | |
|---|---|---|---|---|
| 4,629,063 A * | 12/1986 | Hodlewsky | .......... | B65G 37/005 198/626.6 |
| 4,798,281 A * | 1/1989 | Egger | .................... | B65G 15/14 198/626.5 |
| 4,809,846 A * | 3/1989 | Hodlewsky | .......... | B65G 17/086 198/626.6 |
| 5,000,311 A * | 3/1991 | Abbestam | .............. | B65G 17/08 198/690.2 |
| 5,219,065 A * | 6/1993 | Hodlewsky | .......... | B65G 17/086 198/626.6 |
| 5,429,226 A * | 7/1995 | Ensch | ..................... | B65G 17/44 198/803.14 |
| 6,772,876 B2 * | 8/2004 | Spangenberg | ....... | B65G 37/005 198/867.02 |
| 2013/0277176 A1 * | 10/2013 | Corlett | ................... | B65G 17/44 198/626.1 |

* cited by examiner

Primary Examiner — Mark A Deuble

(57) ABSTRACT

A container gripping device for use on machines which are used for filling, capping, sterilizing, or the like containers, particularly fluid containers such as plastic bottles, wherein the device has a base adapted for attachment to the links of a chain conveyor, wherein the device has a container gripper body mounted on the base, wherein the base is provided with a hook structure at each of its ends, wherein the gripper body ends have recessed floor portions, wherein locking tabs on the hook structures are in engagement with the upper surface of the recessed floor portion, and wherein the longitudinal outer end surface of the hook structures lie substantially flush with the faces of the body ends.

6 Claims, 3 Drawing Sheets

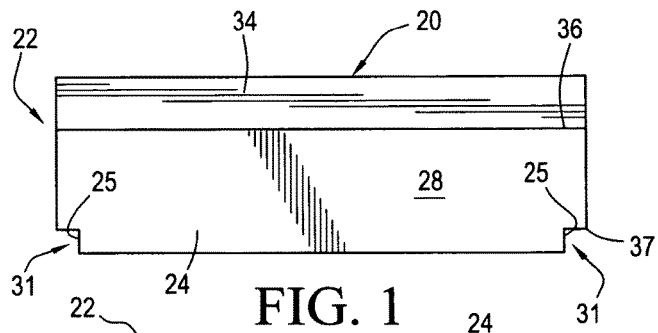
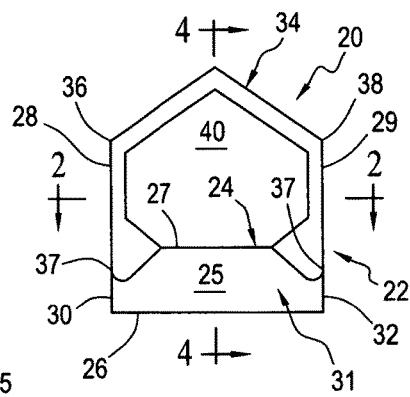
FIG. 1
FIG. 3
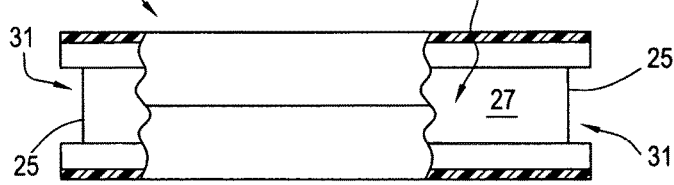
FIG. 2
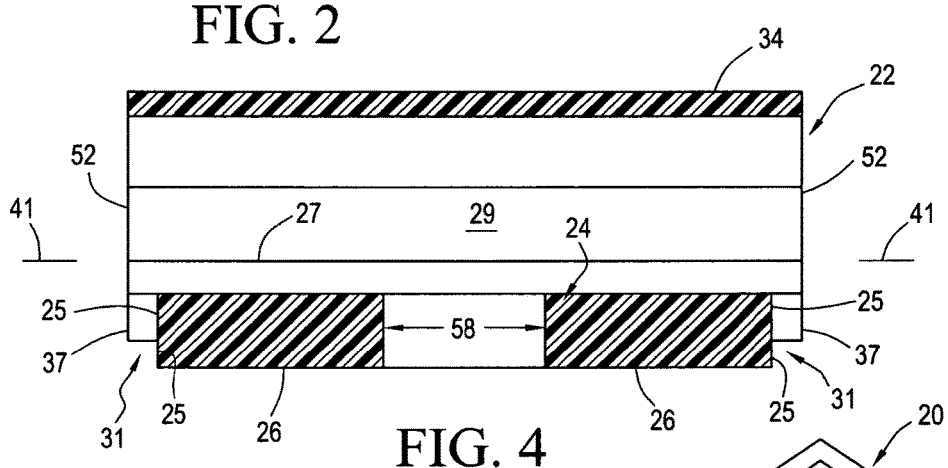
FIG. 4
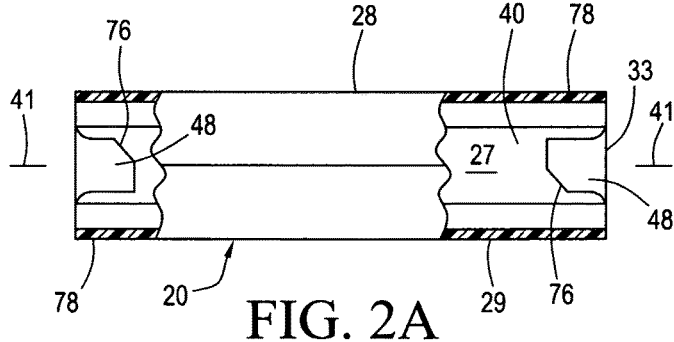
FIG. 2A
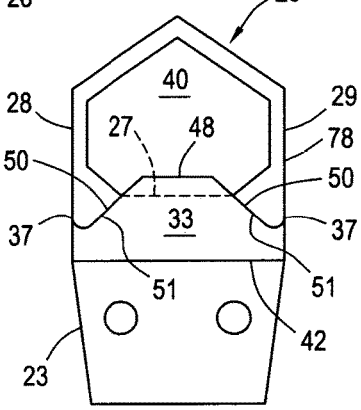
FIG. 7

FLUSH ENDS CONTAINER GRIPPER

FIELD

This invention is directed to a unique and improved product gripper structure for use in gripping a product, e.g., plastic bottles or other containers and transporting them to a bottle processing station by way of a container capturing or clamping conveyor chain on which the gripper is mounted, wherein the chain is typically made up of roller base chain links provided with the snap-on product gripper means. Such gripper means comprise typically an elastomeric (semi-rigid) gripper body and a plastic fairly rigid base (support) plate connected to a link of the conveyor by means of a quick attachment structure, wherein the base plate carries the product gripper body of resilient plastic material such as rubber, polyurethane, polyolefin, polyester, polyamides, or the like which may be plasticized to a desired rigidity, herein referred to as "elastomeric" and fixed onto the top surface of the base plate. Two such chains typically run on edge and parallel to each other. The products such as liquid containers are picked up in their path by squeezing them between the laterally opposing gripper members as the chains, e.g., are made to converge. The chains are able to flex within a plane substantially coextensive with the longitudinal axes of the grippers in order to raise or lower the product being conveyed, and then the two chains separate, thereby setting the products on a conveyor or platform at a different level. See U.S. Pat. Nos. 5,219,065, and 6,851,549, the disclosures of both hereby being incorporated herein by reference in their entireties, for the general layout of product capturing chain constructions which could be used commercially with the present gripper.

Prior base plate structures for mounting to gripper bodies have employed mounting hooks integrally formed on the ends of the base plate, which hooks have tabs which are inserted into the open ends of elongated hollow tubular container gripper bodies. The main portion of these hooks lie to the exterior of the ends of the gripper body and frequently during movement of the gripper along the container processing machine manage to run into interference (strike) against other structures on the machine and cause failure of the gripper by e.g., extracting the hook and tab from the body section. Other such interferences can occur during handling, storage, shipping or the like of the grippers.

Further, prior base plate structures have encountered stability problems associated with gripper bodies which are used for larger and more lengthy gripper bodies which tend to bend and twist when gripping, e.g., larger and heavier container products, thusly having markedly shortened production lives. Such deformation can put the container in an incorrect position relative to stations on container processing machines such as, e.g., technically difficult filling or capping operations or to the transfer of the container to other sections or stations of the machine.

The present product gripper structure in a most preferred embodiment alleviates these problems through a unique mating shoulder structure of the ends of the gripper body and of the associated base plate ends, and further through a quick release locking structure preferably located at the longitudinal middle portion of the gripper base and gripper body, both of which structures provide greatly enhanced structural stability and longevity to the present gripper structure, particularly where the gripper body is elongated and wherein lateral forces against the gripper body ends and/or middle portion become exaggerated.

SUMMARY OF THE PRESENT INVENTION

A container gripper structure of molded polymeric material for use on a container carrying (transport) conveyor, the gripper structure having a molded base and a molded product gripper body, wherein in preferred embodiments the ends of the gripper body and the base lie in a flush non-protruding plane, wherein unique laterally confining mating shoulder structures are provided on the side ends of the gripper body and of a locking hook structural portion of the gripper base, and most preferably wherein cooperating elements of a quick disconnect coupling structure are provided on contiguous, generally mid-section portions of the gripper base and of the gripper body, whereby a greatly enhanced connection strength between said base and said body is effected.

BRIEF DESCRIPTION OF THE DRAWINGS

Referring to the drawings herein wherein the figures are not necessarily drawn to scale or consistent proportions, wherein exemplary dimensions are given in inches, wherein said dimensions shown of the structures are examples only and do not limit the scope of the claims, and wherein:

FIG. 1 is a side view of a preferred form of gripper body;

FIG. 2 is a top view of the gripper body of FIG. 1 with wall portions broken away for clarity;

FIG. 2A is a cross-sectional view of assembled end portions of the gripper body section and the base showing the locking hook in operating position;

FIG. 3 is an end view of the gripper body of FIG. 1;

FIG. 4 is a longitudinal cross-sectional view taken along line 4-4 in FIG. 3;

FIG. 7 is an end view taken along line 7-7 in FIG. 6 with the gripper base in position;

DETAILED DESCRIPTION OF THE DRAWINGS

Figure 5:
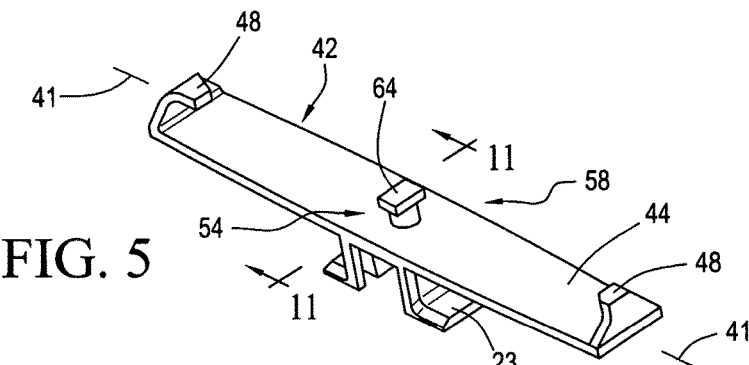
FIG. 5 is an isometric view of a preferred embodiment of the present gripper base.
Figure 6:
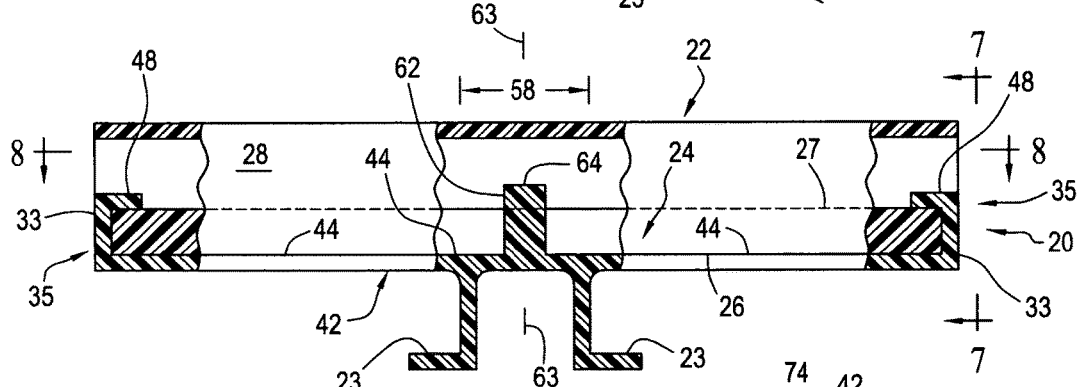
FIG. 6 is a side view of a gripper base similar to FIG. 1 as interlocked to an elastomeric gripper body with portions of the body side wall broken away for clarity.

Referring to the drawings and to the claims herein, the present invention in preferred embodiments comprises a product gripper construction generally designated 20 having an elongated gripper body section 22 and a base section 42 having a longitudinal axis 41 and a lateral axis 11 and having a conveyor chain mounting structure 23. Section 22 is comprised of semi flexible elastomeric material and having a body floor 24 with ends 25 which are cut back to provide recesses 31 into which the connector sections 33 of locking hooks 35 described below are nested. Said gripper body section 22 further having a substantially planar bottom surface 26 and upper surface 27 lying in a plane defining the bottom of cavity 40, substantially parallel laterally spaced side walls 28, 29 upstanding from longitudinally extending edge portions 30, 32 respectively of said floor, wherein the lower portions 37 of the ends of said side walls are cut back to the same extent as floors ends 25 to provide recesses 31 also in said side walls for accommodating said connector sections 33 of the locking hooks 35. A product engaging ceiling cap 34 extends to and between outer upper edge portions 36, 38 of said side walls to provide an open ended, longitudinally extending tunnel cavity 40. The gripper body section 22, particularly cap 34 can have any configuration which may be required for gripping a particularly configured container.

The gripper construction further comprises, preferably, a semi rigid elongated, molded plastic gripper base section 42 having a substantially planar upper platform surface 44 for engaging and supporting body section 22.

Further in the drawings the locking hook structure 35 is provided integral with each end of base section 42, each said hook structure having a generally vertical connector section 33 with a locking tab portion 48 inserted into an end portion of cavity 40 and engaging floor surface 27. Section 33 is formed with angled shoulder portions 50 which engage mating shoulders 51 formed in the adjacent recessed sides of body section 22 for fixing the position of the gripper body end portions on the base section 42.

In the embodiment of the drawings the ends 25 of floor 24 and the lower end portions 37 of the sides are recessed (cut back) in a special configuration whereby the hook connector sections 33 lie flush with the end faces 52 of the gripper body section sides and whereby the engagement of shoulders 50 with shoulders 51 further prevent any lateral movement of the gripper body ends relative to the base section 42. This structure prevents accidental extraction of the hook structure from the body section regardless of any impact on the hook structure which might reasonably be expected to occur.

Figure 8:
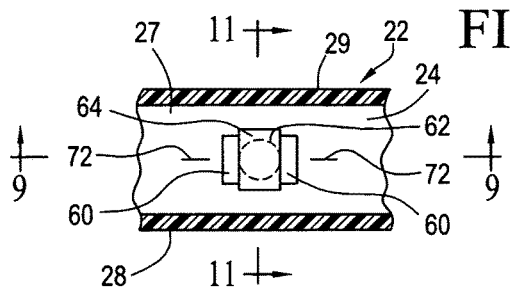
FIG. 8 is a longitudinal cross-sectional view taken along line 8-8 in FIG. 6.
Figure 10:
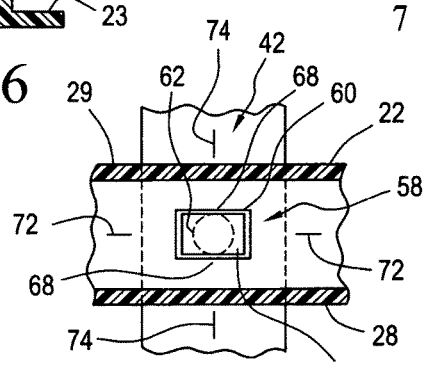
FIG. 10 is a view as in FIG. 8 but showing head 64 and aperture 60 aligned for assembly.
Figure 9:
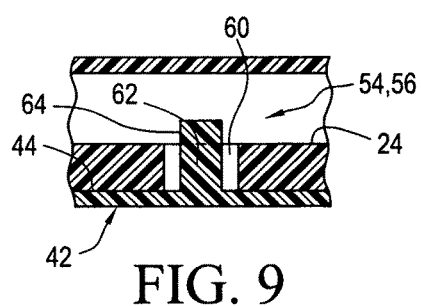
FIG. 9 is a cross-sectional view taken along line 9-9 in FIG. 8.
Figure 11:
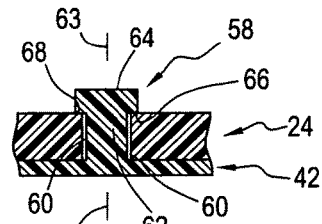
FIG. 11 is a cross-sectional view taken along line 11-11 in FIG. 8.
Figure 14:
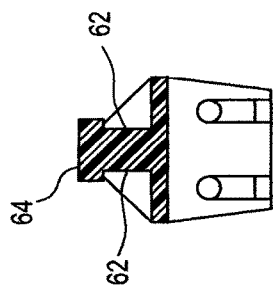
FIG. 14 is a cross-sectional view taken along line 14-14 in FIG. 12.
Figure 12:
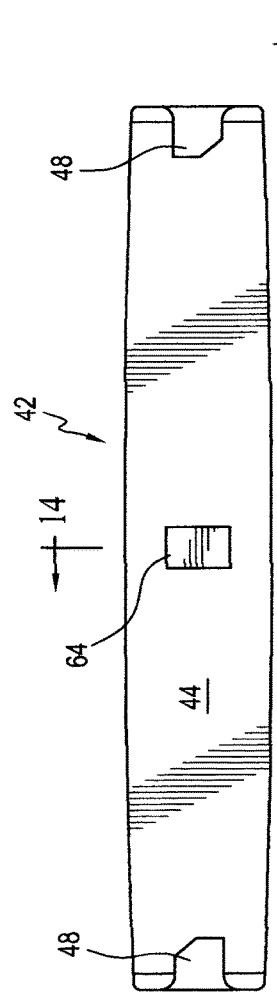
FIG. 12 is a top plane view of the present preferred base.
Figure 13:
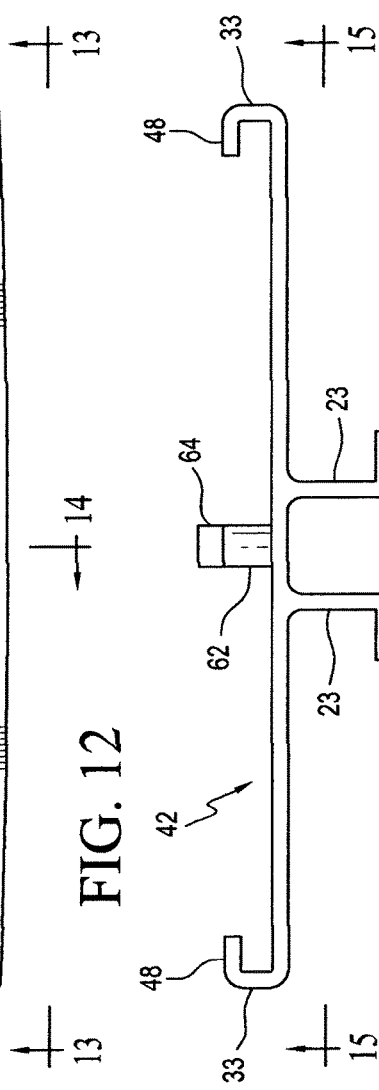
FIG. 13 is a side edge on view taken along line 13-13 in FIG. 12.
Figure 15:
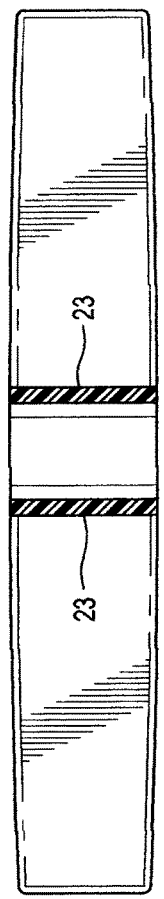
FIG. 15 is a cross-sectional view taken along line 15-15 in FIG. 13.

In a preferred embodiment of the present gripper structure, cooperating components 54 on base section 42 and 56 on body floor 24 of quick release locking means are provided on longitudinally central portions 58 of body floor 24 and of platform surface 44 of base section 42 for preventing any significant lateral and vertical relative movement between said body and said base. These components 56, 54 in a preferred embodiment of the present invention comprise a respectively a generally rectangular aperture 60 through body floor 24 and a post member 62, preferably round in lateral cross-section and having a vertical axis 63 and, protruding upwardly from platform surface 44 of base 42 and formed with a locking head 64 on its upper end. Each of said aperture 60 and head 64 have a major dimension or axis 72 and a minor dimension or axis 74 (FIG. 10), wherein the dimensions and configuration of said aperture, and the dimension and configuration of said post and head allow said post and head to be inserted through said aperture when said major dimensions (axes) are in substantial alignment as shown in FIG. 10, and wherein underneath surface portions 66 of said head slide over contiguous upper surface portions 68 of body floor 24 adjacent to said aperture when said major dimensions 72 are moved (rotated) out of alignment as shown in FIGS. 8 and 11. The term "dimension" as used herein refers to horizontal surfaces as viewed in the drawings, i.e., horizontal maximum length and width of said components. Preferably, said aperture and said head each have a rectangular configuration and wherein the horizontal dimensions of said aperture are from about 0.001 in. to about 0.1 in., greater than the dimensions of said head to allow easy sliding together of the locking components.

In assembling body 22 to base 42, body 22 is placed at a right angle to base 42 as shown in FIG. 10 wherein head 64 is passed up through aperture 60 in the body floor 24. Body 22 is then rotated e.g., clockwise in FIG. 2B around post member 62 on surface 44 of the base to engage a leading beveled edge 76 of each tab portion 48 with a lower end portion 78 of side walls 28, 29. Further rotation of body section 22 will resiliently cam (bend) side wall portions 78 inwardly to a point where each tab 48 will snap into cavity 40 and assume its locking position as shown in FIG. 2B. Simultaneously therewith, locking head 64 will lock body 22 to base 42 as shown in FIG. 11.

The invention has been described in detail with particular reference to preferred embodiments thereof, but it will be understood that variations and modifications will be effected within the spirit and scope of the invention.

I claim:

1. A product gripper device comprising an elongated gripper body section of elastomeric material having a longitudinal axis and a lateral axis, opposite end portions, a substantially planar floor having longitudinally extending edge portions and end portions, substantially parallel laterally spaced side walls upstanding from said longitudinally extending edge portions of said floor, said side walls having outer upper edge portions and end portions, and a product engaging ceiling cap extending to and between outer edge portions of said side walls to provide an open ended, longitudinally extending cavity, wherein a bottom plane of said cavity is defined by an upper surface of said floor and wherein the end portions of said floor are cut back from lower portions of said end portions of said side walls to form a recess at each end of said body below said bottom plane of said cavity, a semi-flexible elongated gripper base section comprising a substantially planar, elongated platform having an upper platform surface engaging said body floor and supporting said body, a hook member integral with each end of said base, each said hook member having a substantially vertical connector section nested in a said recess, and further having a generally horizontal tab portion integrally formed on an upper end of said connector section and being inserted into an end portion of said cavity and engaging upper surface portions of said floor for fixing the position of said end portions of said body on said base.

2. The gripper device of claim 1 wherein opposing laterally facing edge shoulder portions of said connector section of each said hook member are in mating contact with opposing laterally facing shoulder portions of end portions of said body side walls.

3. The gripper device of claim 2 wherein all said shoulder portions are slanted upwardly and inwardly at an angle of from about 35° to about 60° to said platform surface of said base section.

4. The gripper device of claim 1 wherein cooperating components of quick release locking means are formed on longitudinally central portions of said floor and said base section for preventing any significant movement between said body section and said base section.

5. The gripper device of claim 4 wherein said components comprise a generally rectangular aperture formed through said floor, and a post member having a vertical axis and protruding upwardly from said platform surface, wherein a locking head is provided on an upper end of said post member, wherein each of said aperture and head have a major longitudinal dimension and a minor lateral dimension, wherein the dimensions and configuration of said aperture, and the dimension and configuration of said post and head allow said post and head to be inserted through said aperture when said major dimensions are in substantial alignment, and wherein underneath surface portions of said head slide over surface portions of said floor adjacent to said aperture when said major dimensions are rotated out of alignment about said vertical axis.

6. The gripper device of claim 5 wherein said aperture and said head each have a rectangular configuration and wherein the longitudinal and lateral-dimensions of said aperture are from about 0.001 in. to about 0.1 in., greater than the longitudinal and lateral dimensions of said head.

\* \* \* \* \*